United States Patent [19]

Tanikoshi

[11] Patent Number: 4,472,665
[45] Date of Patent: Sep. 18, 1984

[54] MOTOR

[75] Inventor: Kinzi Tanikoshi, Miyoshi, Japan

[73] Assignee: Canon Kabushiki Kaisha, Tokyo, Japan

[21] Appl. No.: 410,888

[22] Filed: Aug. 24, 1982

[30] Foreign Application Priority Data

Aug. 28, 1981 [JP] Japan ............................. 56-135078
Sep. 25, 1981 [JP] Japan ............................. 56-151659
Nov. 18, 1981 [JP] Japan ............................. 56-184713

[51] Int. Cl.³ .......................................... H02K 29/00
[52] U.S. Cl. .................................. 318/254; 318/138; 318/439; 318/318
[58] Field of Search ............... 318/138, 254 R, 254 A, 318/254, 439

[56] References Cited

U.S. PATENT DOCUMENTS

| | | | |
|---|---|---|---|
| 4,114,073 | 9/1978 | Uzuka | 318/254 A X |
| 4,135,120 | 1/1979 | Hoshimi et al. | 318/138 |
| 4,246,518 | 1/1981 | Kögler et al. | 318/138 |
| 4,296,362 | 10/1981 | Beasley | 318/439 |
| 4,354,145 | 10/1982 | Janssen | 318/138 X |
| 4,373,148 | 2/1983 | Gutz | 318/254 |
| 4,393,339 | 7/1983 | Kimura | 318/254 |
| 4,403,177 | 9/1983 | Weber et al. | 318/138 X |
| 4,405,885 | 9/1983 | Okamoto | 318/138 X |

FOREIGN PATENT DOCUMENTS 2071940  9/1981  United Kingdom ................ 318/254

Primary Examiner—J. V. Truhe
Assistant Examiner—Paul Shik Luen Ip
Attorney, Agent, or Firm—Fitzpatrick, Cella, Harper & Scinto

[57] ABSTRACT

In a motor in which the currents to the exciting coils are controlled by the signals from the Hall elements (H1, H2) which detect the pole positions of a permanent magnet (Mg), the Hall elements are positioned at an electrical angle of 45° with respect to the exciting coils (22, L1, L2, L3, L4), and the output signals of said Hall elements are converted into pulses for conducting digital control of the currents to the exciting coils.

3 Claims, 31 Drawing Figures

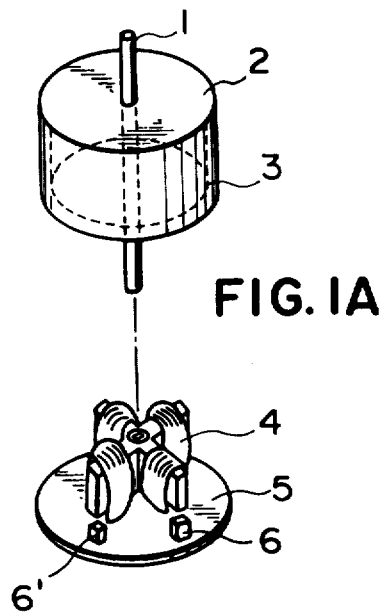
FIG. IA
FIG. IB
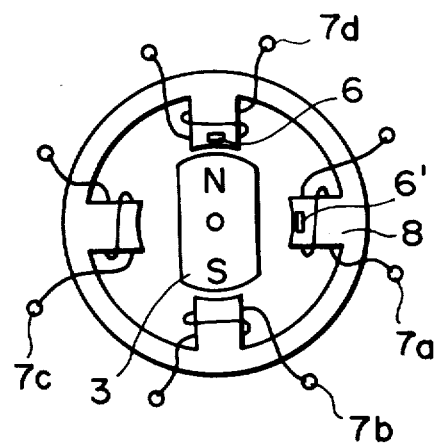
FIG. 2
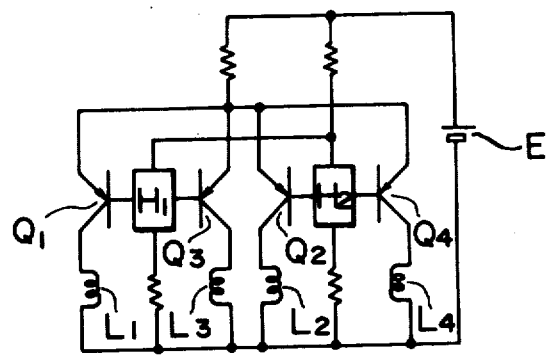
FIG. 3

FIG. 4
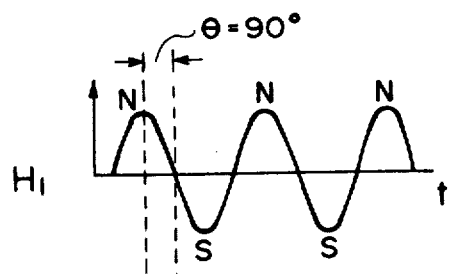
(A) $H_1$
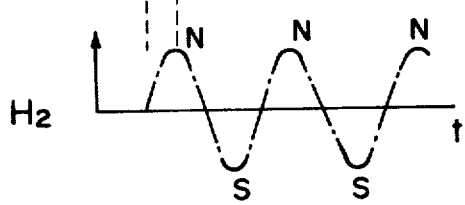
(B) $H_2$
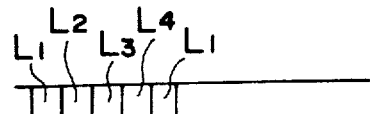
(C)
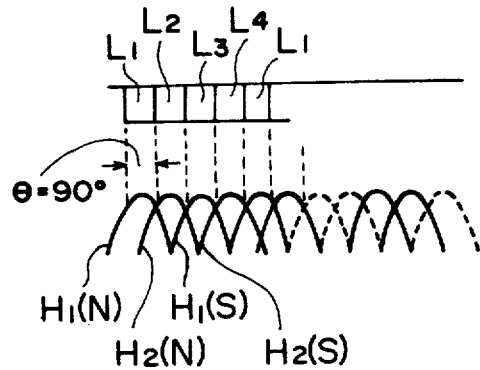
(D)
FIG. 5
(B)
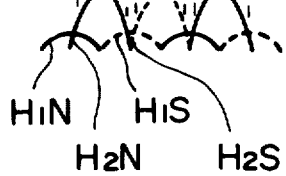
(A)

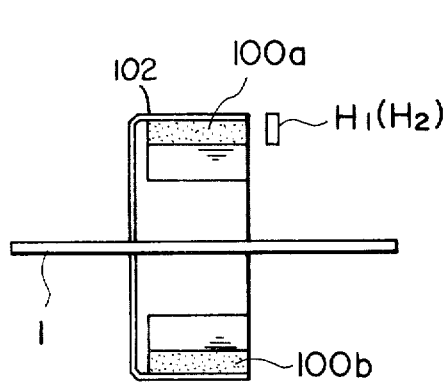
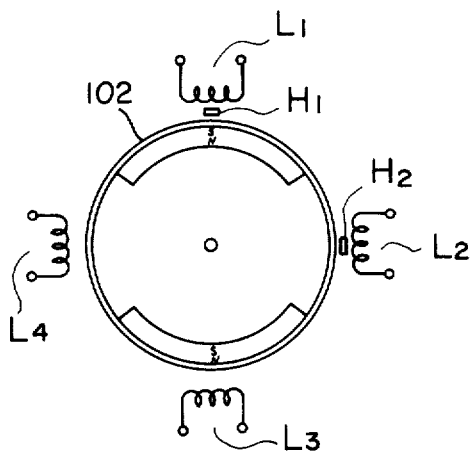
FIG.15A  FIG.15B
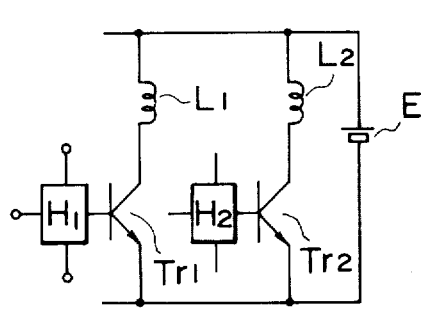
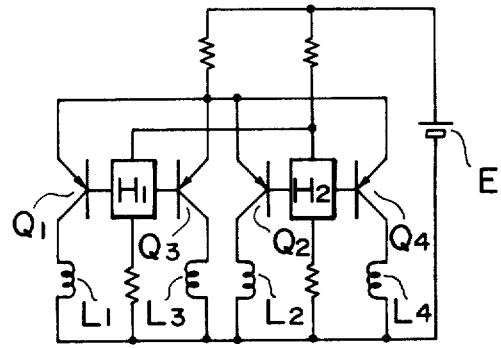
FIG.16A  FIG.16B

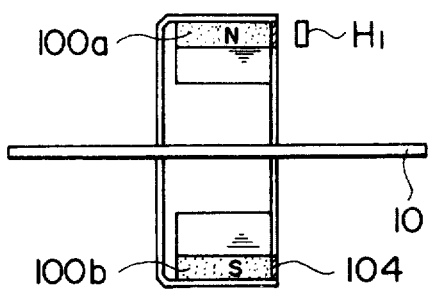
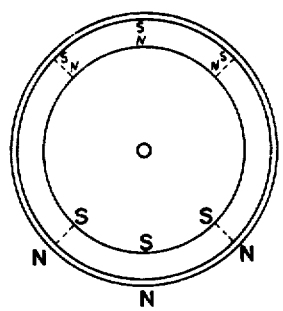
FIG.19A  FIG.19B
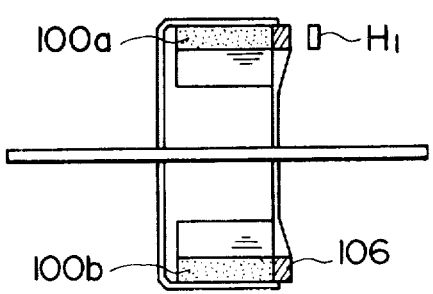
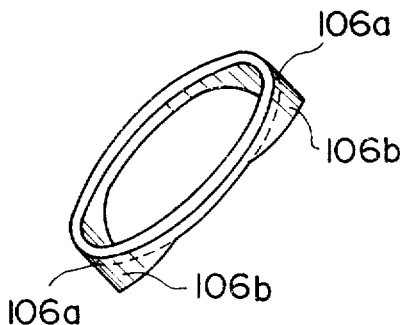
FIG.20A  FIG.20B
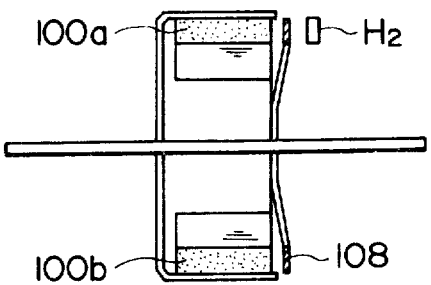
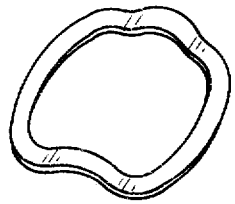
FIG.21A  FIG.21B 4,472,665

MOTOR

BACKGROUND OF THE INVENTION

1. Field of the Invention

The present invention relates to a DC motor, for example a motor in which the amount of electric currents to be applied to exciting coils is controlled by means of electromagnetic detectors such as Hall elements or devices, and more particularly to an improvement in the output control for said Hall elements.

2. Description of the Prior Art

A brushless motor is known as one type of DC motors in which Hall elements are utilized for detecting the position of a rotor composed of a permanent magnet.

In a prior brushless motor, drive coils are positioned on a stator, and the Hall elements are usually provided at the same or 180° opposed phase positions relative to the coils to detect the position of the rotor. More specifically the drive currents to be applied to the drive coils are switched in accordance with output signals from a pair of Hall elements having a relative phase difference of 90°, to thereby rotate the rotor. FIGS. 1A and 1B are perspective views showing an example of the conventional brushless motor, wherein FIG. 1A shows an external type rotor and FIG. 1B shows a stator to be positioned therein. In FIG. 1A there are shown a shaft 1, a rotor yoke 2 and a permanent magnet 3 constituting the rotor. In FIG. 1B there are shown drive coils 4 of 4-pole structure, and a stator substrate 5 on which a stator yoke having the above-mentioned drive coils and sensors or Hall elements 6, 6' are fixed as illustrated. The stator is inserted into the lower part of the rotor shown in FIG. 1A to constitute the brushless motor.

FIG. 2 is a schematic view showing the internal structure of a conventional brushless motor with an internal type rotor, wherein Hall element sensors 6, 6' are fixed at the same phase positions as two poles 7d and 7a of 4-pole stator coils 7a-7d. As explained in the foregoing, in the conventional brushless motor, the sensors 6, 6' for detecting the rotor position are inevitably positioned close to the stator coils and are therefore easily influenced magnetically by the excitation of the drive coils, so that the detection signals of the rotor position are perturbed, causing changes in the conduction angles of the current waveforms to the drive coils.

FIG. 3 shows a part of a conventional drive circuit for the brushless motor utilizing Hall elements H1, H2. FIG. 4 shows the output waveforms of the Hall elements of FIG. 3 in normal operation, wherein the parts (A) and (B) respectively show the output waveforms of said Hall elements H1, H2. Curves in the part (D) show the output waveforms in a state where the Hall elements provide mutually equal outputs, in which each of the exciting coils L1-L4 is energized during a constant electrical angle of 90° with a constant drive current waveform, as shown in the part (C).

However, when the Hall elements H1, H2 are located close to or at the same phase positions as the exciting coils, as shown in FIG. 1 or FIG. 2, the output signals from the Hall elements H1, H2 may become unbalanced as shown in FIG. 5 (A) due to the influence of heat from the coils. Such unbalance leads to different conduction angles of the drive current waveforms for the exciting coils L1-L4, as shown in FIG. 5 (B), thus resulting in uneven or reduced torque and undesirable vibrations.

Although it is already proposed to position the Hall elements apart from the exciting coils in order to avoid the thermal influence thereof, such arrangement inevitably enlarges the motor structure, hindering the size reduction of the motor and the improvement in the winding density of exciting coils.

SUMMARY OF THE INVENTION

The prime object of the present invention is to resolve the aforementioned drawbacks by avoiding the changes in the angle of conduction to the exciting coils resulting from the aforementioned changes in the output signals of the Hall elements.

The above-mentioned object is achieved according to the present invention by a drive circuit and a motor structure suitable for said drive circuit, wherein the AC output waveforms from the Hall elements are changed into pulses and the currents to the exciting coils are digitally controlled through logic circuits instead of analog control in order to maintain a constant conduction angle in the current to each exciting coil.

Another object of the present invention is to provide a drive circuit in which the output signal of the Hall elements are changed into pulses and the voltages induced in the exciting coils are detected to obtain pulse signals, and both pulse signals are utilized for achieving constantly stable motor rotation.

Still another object of the present invention is to provide, in a motor in which Hall elements detect the pole positions of a permanent magnet to control switching of the currents to exciting coils, an improved motor structure or an improved Hall element arrangement for allowing superior detection of output signals from the Hall elements.

Still another object of the present invention is to provide an improvement in a motor of the above-mentioned sort, particularly an improvement in a frequency generating part for detecting the motor revolutions.

Other objects and features of the invention will be apparent from the following description taken in conjunction with the attached drawings.

BRIEF DESCRIPTION OF THE DRAWINGS

FIGS. 1A through 5 illustrate the prior art wherein:

FIG. 1A is a schematic view of the rotor of a motor with an outer type rotor;

FIG. 1B is a schematic view of the stator thereof;

FIG. 2 is a schematic view showing the arrangement of the rotor, stator and Hall elements in a motor of inner rotor type;

FIG. 3 is a circuit diagram showing an example of the drive circuit utilizing Hall elements;

FIG. 4 shows the output waveforms of the Hall elements in normal operation and the periods of conduction to the exciting coils; and FIG. 5 shows the effects of changes in the output signals of the Hall elements on the drive circuit utilizing said Hall elements.

FIGS. 6 through 8 illustrate a motor embodying the present invention, wherein:

FIGS. 6, 7A and 7B are views showing the positional relation between the exciting coils and the Hall elements; and FIG. 8 is a longitudinal cross-sectional view of said motor.

FIGS. 12 through 14 illustrate another embodiment of the drive circuit, wherein:

FIG. 12 is a block diagram thereof;

FIG. 13 is a circuit diagram thereof; and

FIG. 14 shows output waveforms at the various circuit portions shown in FIG. 13.

FIG. 15A to 16B illustrate conventional motor structures.

FIGS. 19A to 21B are views showing various examples of the magnetic members.

FIGS. 22A through 22C illustrate the details of the frequency generator in the motor structure shown in FIG. 8, wherein:

FIG. 22A is a perspective view of an embodiment in which the frequency generating coil is fitted into the circuit board; and FIGS. 22B and 22C are perspective views of embodiments in each of which the frequency generating coil is formed in the circuit board.

DESCRIPTION OF THE PREFERRED EMBODIMENTS

Figure 6:
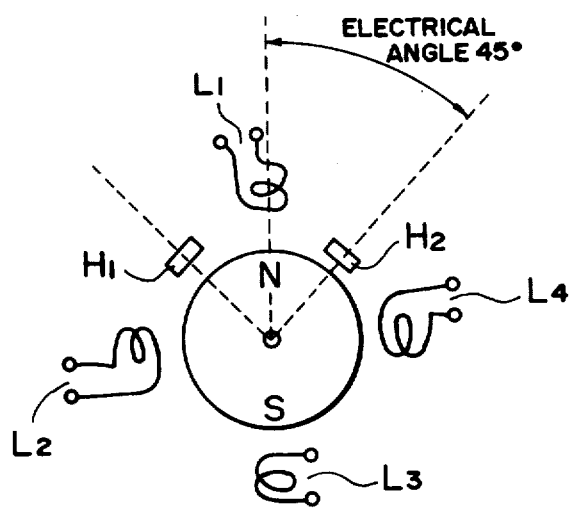
Figure 7A:
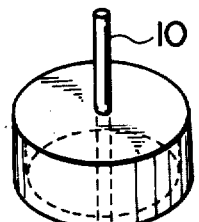
Figure 7B:
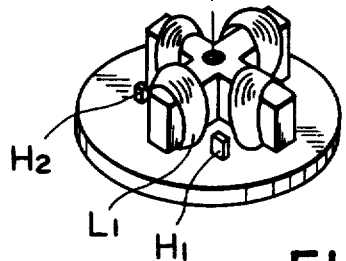
Figure 8:
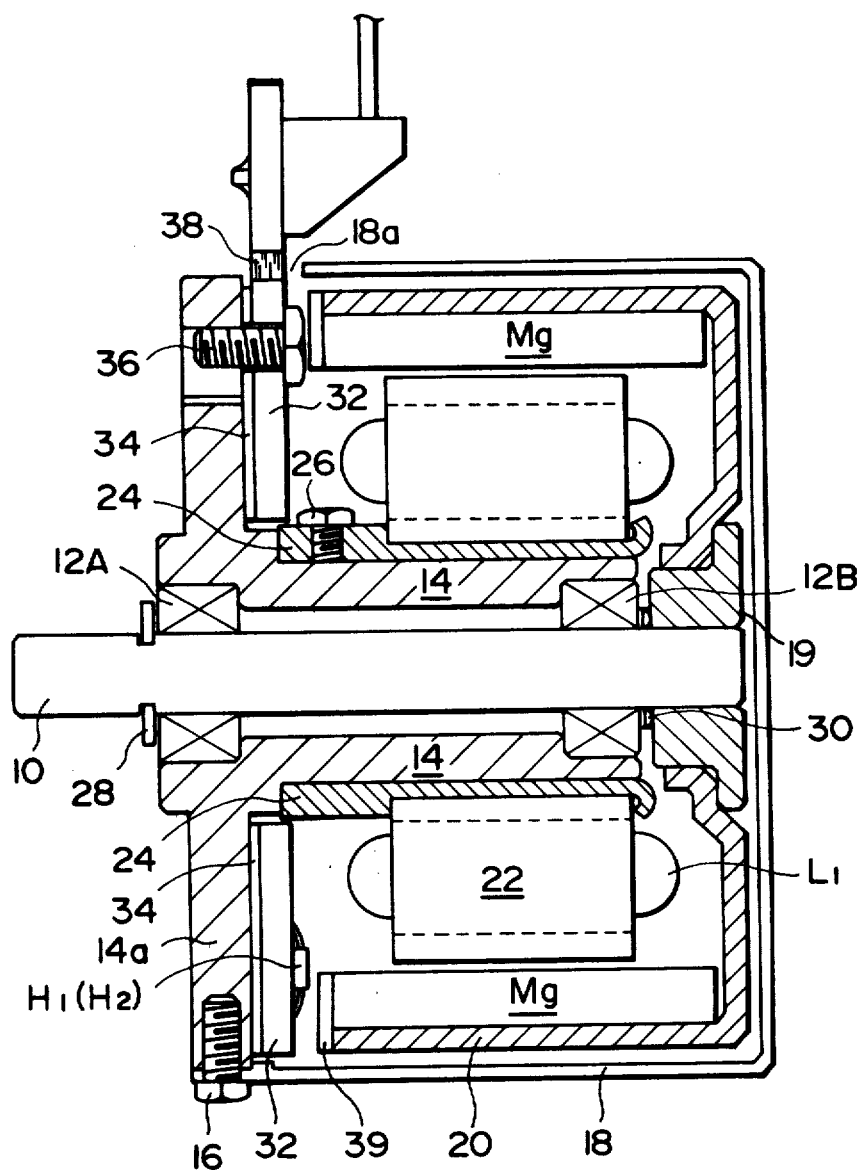
Figure 9:
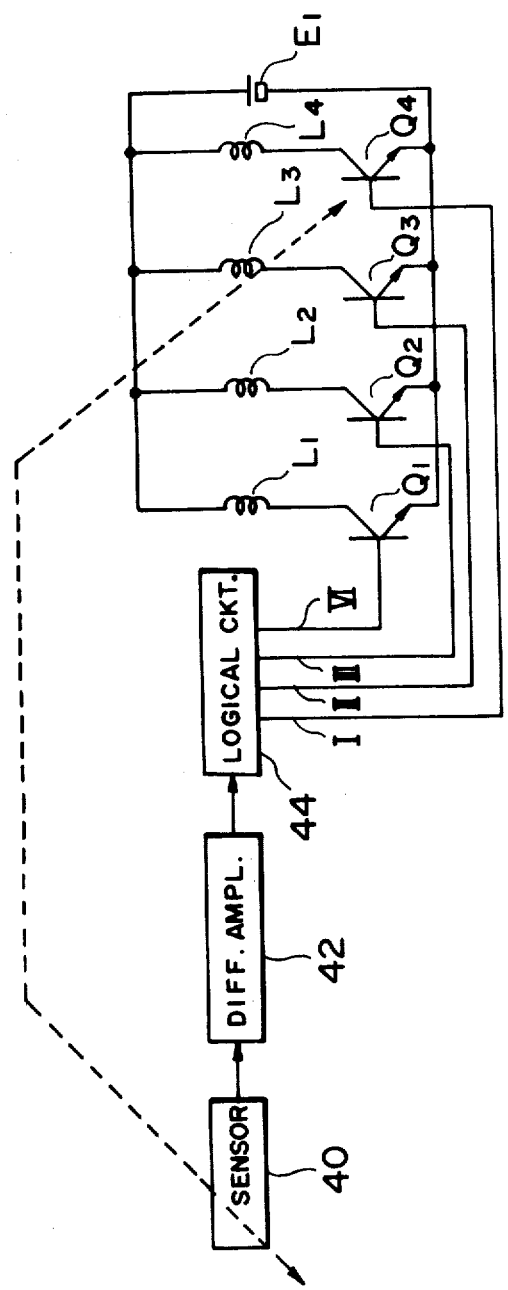
FIG. 9 is a block diagram of the motor drive circuit of the motor shown in FIG. 8.
Figure 10:
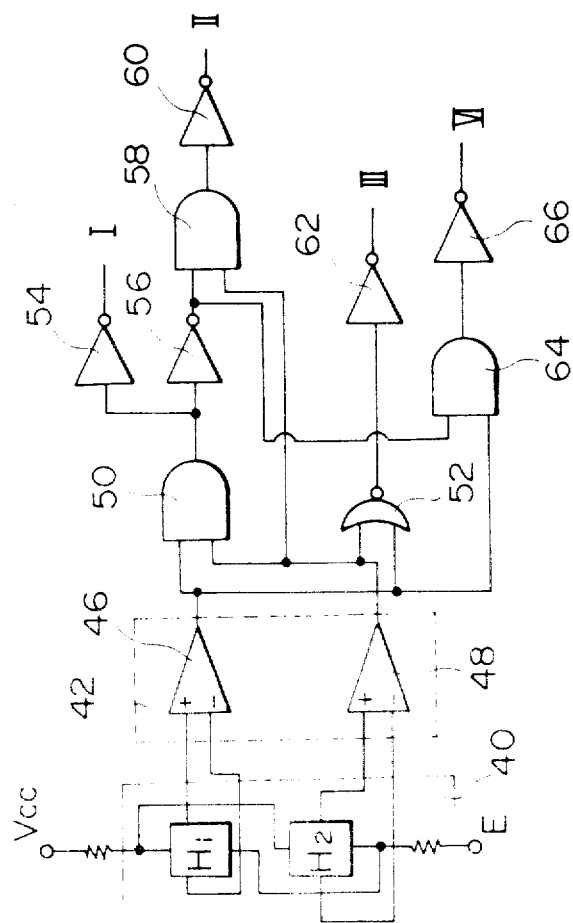
FIG. 10 is a diagram showing the circuit structure in FIG. 9.

FIGS. 6 to 8 show the positional relationship between the rotor and stator in a motor embodying the present invention, while FIG. 9 shows the block diagram of a drive circuit for the motor structured as shown in FIG. 8, and FIG. 10 gives a specific example of the circuit shown in FIG. 9.

FIGS. 6 and 7 illustrate the arrangement of the rotor, stator and Hall elements, in which the Hall elements H1, H2 are positioned at an electric angle of 45° with respect to the exciting coils. Also FIG. 8 is a longitudinal cross-sectional view of an essential part of the motor of the present invention, wherein a rotary shaft 10 is supported by bearings 12A, 12B. A hollow cylindrical member 14 supporting the bearings 12A, 12B is integrally formed with a disk-shaped front cover 14a from a resin material and fixed with screws 16 to a motor case 18. A sleeve member 19 is pressure fitted on said shaft 10, and a rotor yoke member 20 is fitted on said sleeve member 19 at a fitting portion 20a. On the internal periphery of said rotor yoke 20 fixed is a ring or arc shaped permanent magnet Mg. In this manner the rotor is composed of a shaft 10, sleeve member 18, rotor yoke 20, permanent magnet Mg etc.

Exciting coils L1–L4 are wound on stator cores 22 which are fixed on a second sleeve 24 attached to the aforementioned cylindrical member 14 with a screw 26. There are also provided an E-shaped washer 28 and a spring washer 30. A circuit board 32 is fixed, through a yoke 34 for the Hall elements, to the internal face of the aforementioned front cover 14a with screws 36, and is partially exposed to the exterior through an aperture 18a in the motor case 18. In said exposed portion provided is a connector for electric signal communication with an external device.

Hall elements H1, H2 are soldered on said circuit board 32, with such a positional relationship to the exciting coils L1–L4 wound on the aforementioned stator cores 22 as shown in FIGS. 6 and 7. Said circuit board 32 and a frequency generating coil 38 thereon will be further explained later in relation to FIG. 22. A supplementary magnetic member 39 is provided between the Hall elements H1, H2 and the permanent magnet Mg and fixed to said magnet. Said supplementary magnetic member 39 is provided, as will be explained later, for improving the performance of the brushless type motor in which the currents to the exciting coils are controlled by detecting the magnetic pole positions with the Hall elements.

Now reference is made to FIG. 9 showing an embodiment of the drive circuit for use in the brushless motor of the present invention, wherein a sensor unit 40 is provided with the Hall elements H1, H2 fixed on the stator as shown in FIG. 8. The Hall voltages generated by the rotation of the rotor are supplied to a differential amplifier 42 to obtain square-wave (pulse) output signals, which are processed in a logic circuit 44 to obtain drive signals for controlling the currents to the exciting coils of the motor. Power transistors Q1, Q2, Q3 and Q4 are used for supplying currents to the exciting coils L1–L4 in response to said drive signals. E1 indicates a DC power source.

Figure 11:
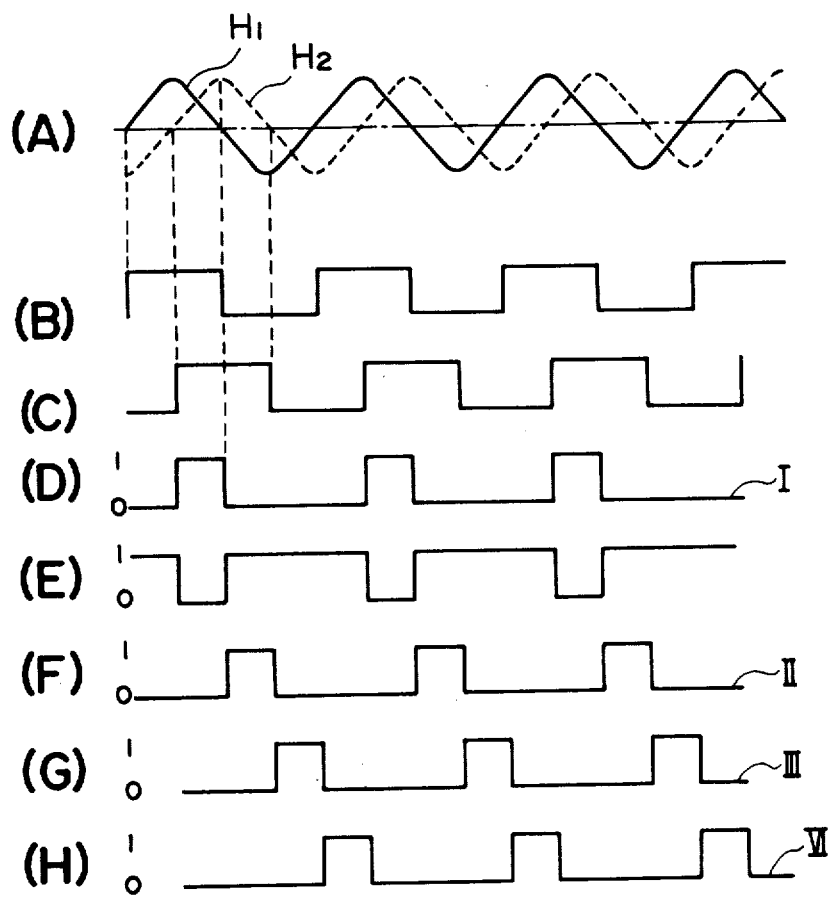
FIG. 11 shows output waveforms at the various circuit portions shown in FIG. 10.

FIG. 10 shows an example of the detailed circuit structures of the blocks 40, 42 and 44 shown in FIG. 9. The Hall elements H1, H2 are fixed on the stator with an arrangement as shown in FIG. 6 and each receives a DC voltage between terminals Vcc and E. The differential amplifier circuit 42 is composed of differential amplifiers 46, 48; and the logic circuit 44 is composed of AND gates 50, 58 and 64; a NOR gate 52; and inverters 54, 56, 60, 62 and 66. Output terminals I, II, III and IV are respectively connected to the bases of the output drive transistors Q1, Q2, Q3 and Q4 (FIG. 9). FIG. 11 is a timing chart showing the current waveforms in various parts of the circuit shown in FIG. 10. In response to the rotation of the rotor composed of a permanent magnet, the Hall elements H1, H2 generate sinusoidal Hall voltages as shown at (A) in FIG. 11, in response to which the differential amplifiers 46, 48 respectively generate square-wave signals as shown at (B) and (C) in FIG. 11. Said signals are supplied to the logic circuit shown in FIG. 10 and processed through the AND gates, NOR gate and inverters as illustrated to produce, at the output terminals I, II, III and IV, drive pulse signals as shown at (D), (F), (G) and (H) in FIG. 11. The exciting coils L1–L4 of the stator are respectively energized according to said pulse signals, thus causing rotation of the brushless motor. The signal (D) in FIG. 11 is obtained by passing the signals (B) and (C) from the differential amplifiers 46, 48 through an AND gate. Also the signal (F) is obtained by passing, with the signal (C), a signal (E), which is obtained by inverting the output (D) from the AND gate 50, through the AND gate 58. The signal (G) is obtained by passing the signals (B) and (C) through the NOR gate 52. The signal (H) is obtained by passing the signals (E) and (B) through the AND gate 64. These signals (D), (F), (G) and (H) are respectively inverted by the inverters 54, 60, 62 and 66 to form the drive signals I, II, III and IV for controlling the drive transistors Q1, Q2, Q3 and Q4.

Figure 12:
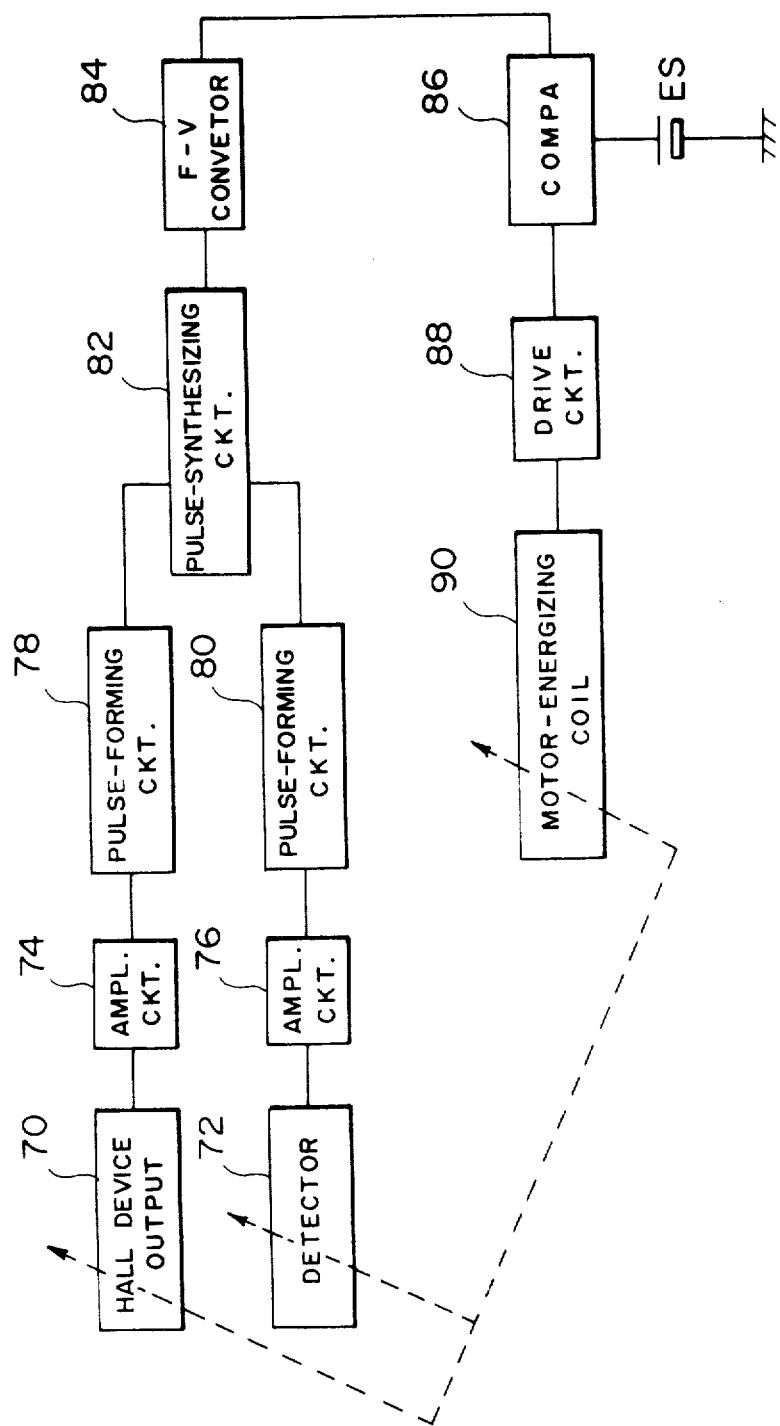
Figure 13:
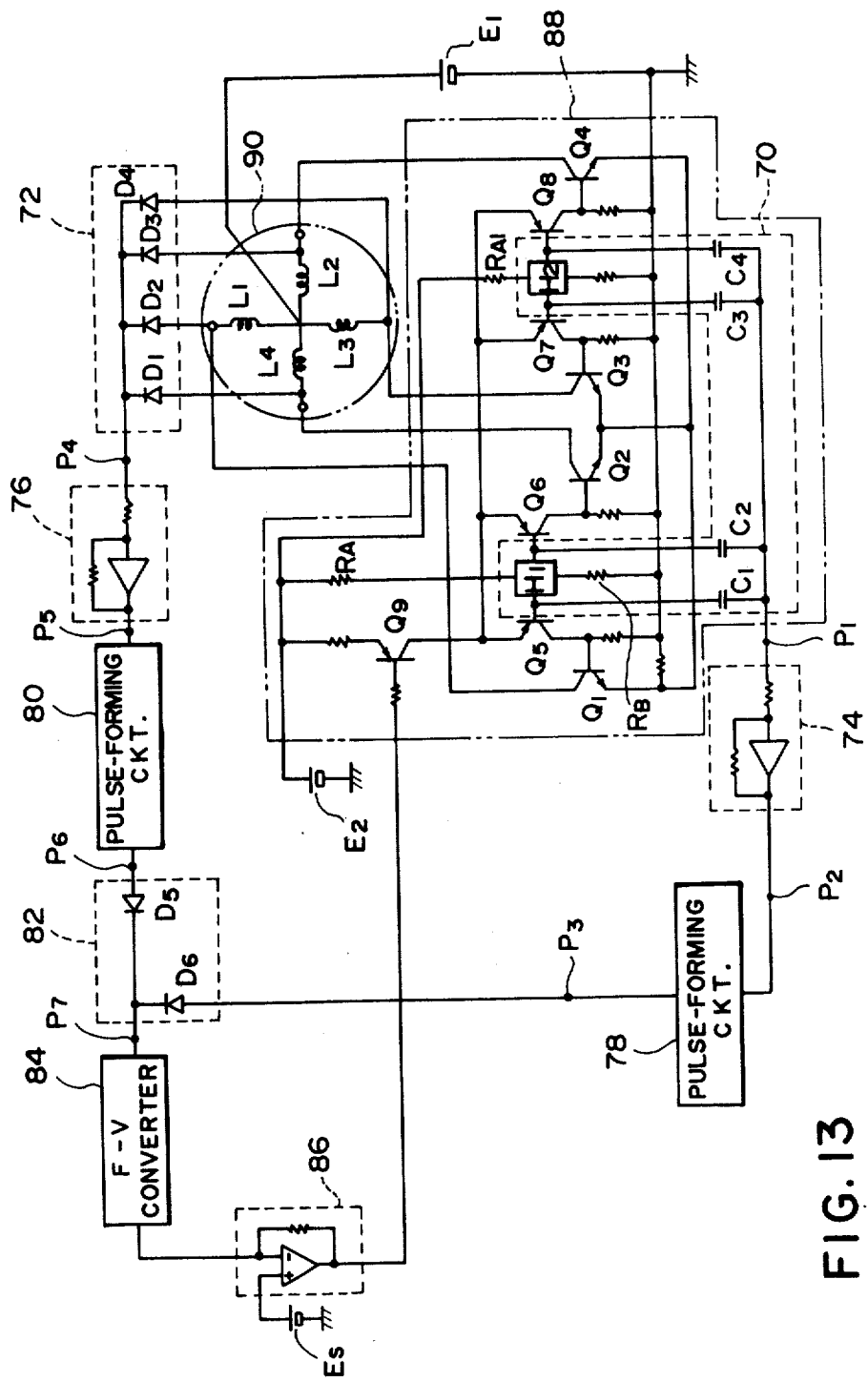
Figure 14:
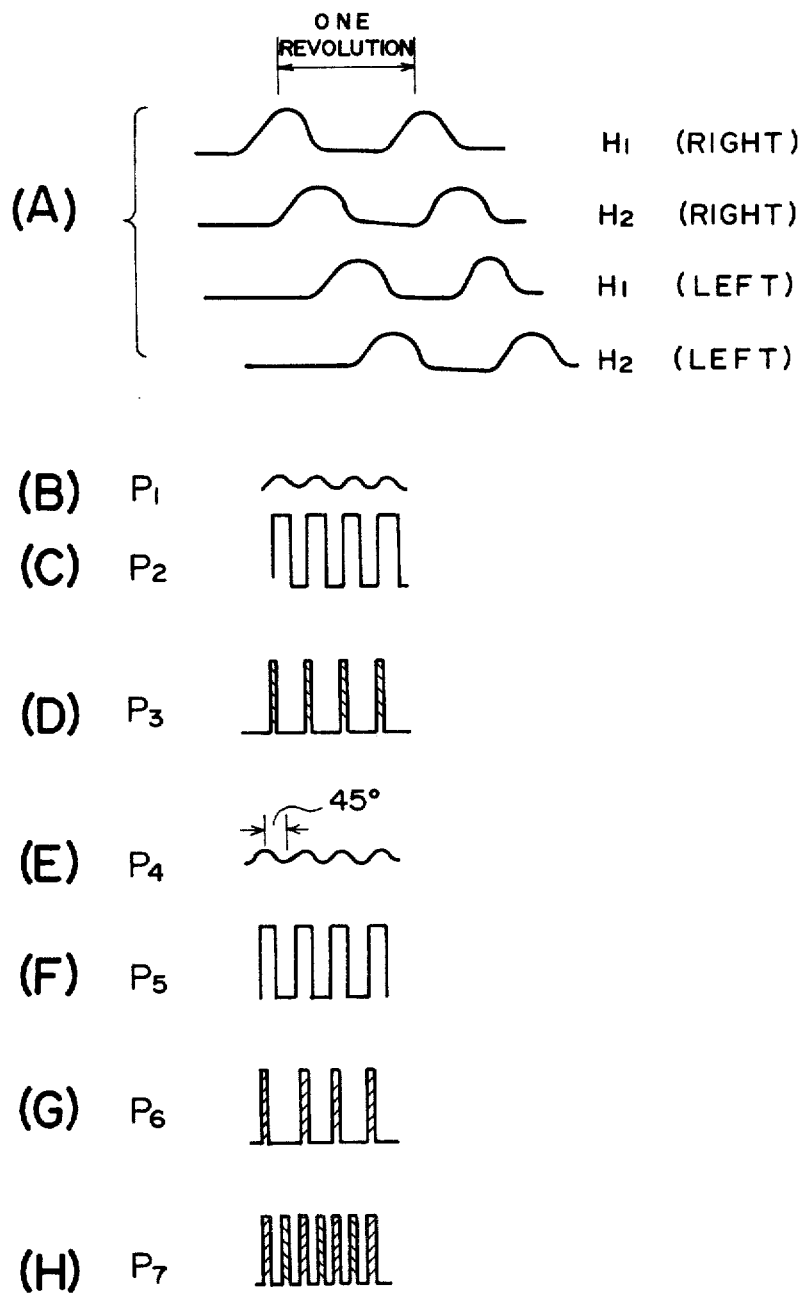

FIG. 12 is a block diagram showing another embodiment of the present invention, in which signals are obtained both from exciting coils and from Hall elements and are synthesized to obtain drive signals for maintaining the constant-speed rotation of the motor. FIG. 13 shows a detailed circuit structure of the blocks shown in FIG. 12, and FIG. 14 shows the output waveforms of the drive circuit of the present embodiment.

In FIG. 13, drive transistors Q5–Q9 are used for controlling the currents to the exciting coils L1–L4 according to the output signals of the Hall elements H1, H2. Said Hall elements H1, H2 are positioned with a phase angle of 45° to the exciting coils L1-L4 as shown in FIGS. 6 and 7. A Hall element output unit 70 provides output waveforms as shown by the curves (A) in FIG. 14, but condensers C1-C4 eliminate DC components to provide at a point P1 the AC component alone as shown by the curve (B). The signal from said Hall element output unit 70 is supplied through an amplifier 74 and a pulse-forming circuit 78, and the resulting pulses of a number corresponding to the output signals of the Hall elements are counted. The curves (C) and (D) in FIG. 14 show the output signals from the above-mentioned circuits.

Diode means 72 is provided for detecting the voltages induced in the exciting coils L1-L4 by the rotation of the rotor and for synthesizing said voltages by diodes D1-D4. The diode means 72 releases an output signal (E) shown in FIG. 14. The signal from said diode means 72 for detecting the voltages induced in the exciting coils is formed into pulses through an amplifier 76 and a pulse-forming circuit 80. The above-mentioned pulse-forming circuits 78, 80 may be composed of monostable multivibrators.

A pulse synthesizing circuit 82 synthesizes the signals from the Hall element output unit 70 and from the diode means 72 for detecting the voltages induced in the exciting coils, through diodes D5, D6, and supplies the synthesized signal to an F-V converter 84 for converting the frequency of the synthesized pulse signal into a voltage.

The output signal from said F-V converter 84 is compared in a comparator 86 with a reference voltage Es, and, where the DC component signal from said F-V converter is equal to the reference voltage Es, the comparator 86 provides a drive circuit 88, for energizing the exciting coils 90, with a predetermined current for maintaining a determined speed of revolution.

In case the speed of revolution of the motor is lower than that determined by the reference voltage Es, a signal lower than the reference voltage is generated in the F-V converter, whereby the comparator 86 supplies the transistor Q9 with a large current to elevate the speed of revolution to the determined value.

As explained in the foregoing, the drive circuit of the present embodiment enables motor control through a logic circuit by forming pulses at the zero-crossing points of sinusoidal signal released from the Hall elements as shown in FIGS. 9 and 10, thus providing a constant-speed controlled motor capable of exact timing control on the drive currents to the exciting coils, thus avoiding unevenness in the rotation or in the torque.

Now there will be given an explanation on the aforementioned supplementary magnetic member 39 used in the motor shown in FIG. 8. In a motor driven in accordance with the output signals of Hall elements, the output voltages of said Hall elements are often distorted according to the shape or magnetization distribution of the permanent magnet fixed on the rotor, so that the input waveforms to said drive circuit become different from the ideal forms, thus deteriorating the output efficiency of the motor. The above-described difficulty will be explained further in the following with reference to the attached drawings.

As shown in FIGS. 15A and 15B, an external tube 102 supporting permanent magnets 100a, 100b is fixed on a rotor shaft 1, and Hall elements H1, H2 are arranged on a stator surrounding said rotor to detect the magnetic fluxes of the magnetic poles 100a, 100b, thus providing drive currents in succession to field coils L1-L4.

FIG. 16A shows an example of a drive circuit for controlling the currents to said field coils L1-L4 in accordance with the Hall voltages generated by said Hall elements H1, H2.

Also FIG. 16B shows an example of a differential type drive circuit.

Figure 17:
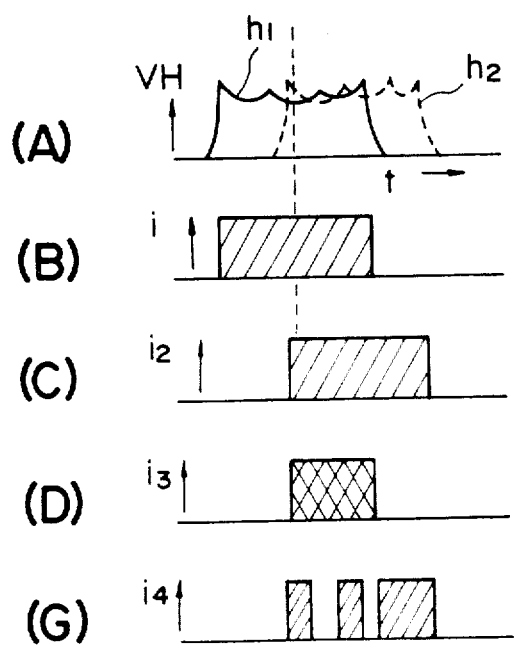
FIGS. 17 and 18 are waveform charts showing output signals of the Hall elements.

In the drive circuit shown in FIG. 15A, the output Hall voltages from the Hall elements when the magnetic poles 100a, 100b of the rotor are rotated through 90° from the position shown in FIG. 15B assume the forms shown at (A) in FIG. 17, wherein the voltage is represented in the ordinate while the time of rotation is represented in the abscissa.

In FIG. 17 (A), the curves h1 and h2 respectively represent the output waveforms of the Hall elements H1 and H2. As shown, the output signal from the Hall element H1 or H2 assumes a trapezoidal form with small waves in the horizontal part, according to the distribution of the magnetization of the magnetic poles on the rotor. The parts (B) and (C) in FIG. 17 show the phase relationship between the currents in the transistors Tr1, Tr2 in the drive circuit shown in FIG. 16A.

In FIG. 17, the part (D) represents an overlapping current supplied to both the transistors Tr1, Tr2 in the drive circuit shown in FIG. 16A. The above-mentioned current is in fact wasted since it is not necessary to supply current simultaneously to said transistors Tr1 and Tr2.

In response to the output waveform from the Hall element shown in FIG. 17 (A), the differential type drive circuit shown in FIG. 16B generates currents as shown in FIG. 17 (G) for driving the transistors Q1-Q4. More specifically, when the Hall voltages h1 and h2 shown in FIG. 17 (A) are applied to the differential type drive circuit of FIG. 16B, small-wave parts in the trapezoid-formed output waveforms cause high and low voltage portions. Since the transistors Q1-Q4 are switched in response to the high voltage peaks, short pulse-formed currents as shown in FIG. 17 (G) are produced, so that the smooth current supply to the field coils L1-L4 cannot be expected.

Figure 18:
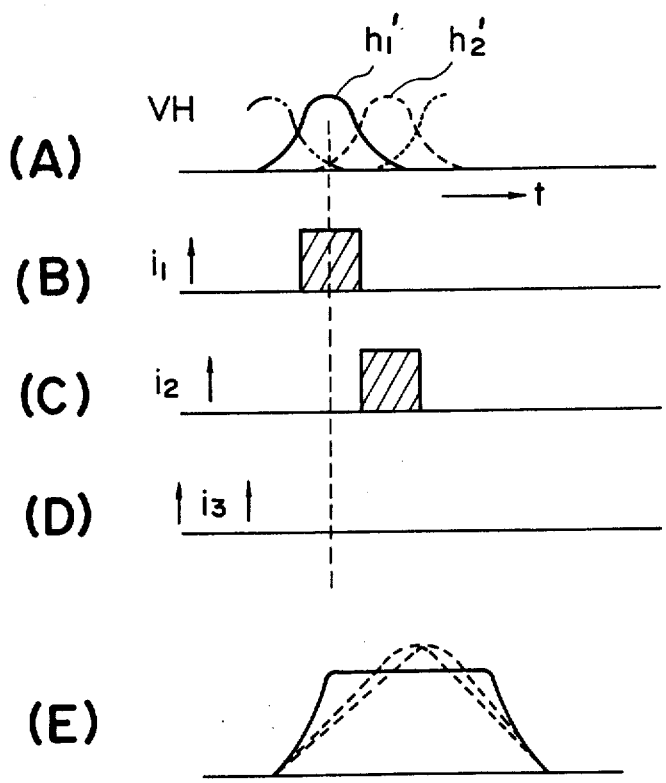

The parts (A), (B), (C) and (D) in FIG. 18 respectively show ideal waveforms suitable for driving the drive circuit shown in FIG. 16A or 16B in response to the output signals from the magnetic pole position detecting means such as Hall elements. The part (A) represents the voltages from said detecting means such as Hall elements, while the parts (B) and (C) represent the currents in the aforementioned transistors Tr1, Tr2 in response to the voltages h1' and h2'. When the output voltages h1', h2' of the Hall elements assume sinusoidal or quasi-sinusoidal form as shown in FIG. 18 (A), the currents in the drive circuit include no overlapping portion as shown by the parts (B) and (C) in FIG. 18, thus avoiding loss in the motor efficiency. Also the differential type drive circuit shown in FIG. 16B does not generate short pulses as shown in FIG. 17 (G) in this case.

In a motor of a structure shown in FIG. 15A or 15B, the sinusoidal or quasi-sinusoidal wave shown in FIG. 18 (A) will be obtained if the motor is arranged to produce a sinusoidal waveform having a single peak voltage during relative rotation of 90° in the clockwise direction from the positional relationship, between the magnetic poles 100a, 100b and the Hall elements H1, H2, shown in FIG. 15B.

FIGS. 19A through 21B show embodiments adapted for generating one peak voltage as shown in FIG. 18.

In a first embodiment shown in FIGS. 19A and 19B, a ring-shaped magnetic member 104 is fixed on an end face of the rotor magnets and disposed to traverse the magnetic fluxes from the magnets 100a, 100b.

With such arrangement, the ring-shaped member 104 is magnetized, whereby the magnetic fluxes of said magnets leak through said ring member. Consequently the waveform shown in FIG. 17 (A) is modified to a single-peak waveform as shown in FIG. 18 (A), which generates the drive currents as shown in FIG. 18 (B) and (C).

In another embodiment shown in FIGS. 20A and 20B, a modification to the embodiment shown in FIGS. 19A and 19B, a ring-shaped magnetic member 106 to be fixed on the end faces of the rotor magnets 100a, 100b has a varying dimension in the thickness direction thereof. Said ring-shaped member 106 may be composed, as shown in FIG. 20B, of a ring 106a of a uniform thickness and arc-shaped magnetic members 106b, 106b adhered on said ring 106a to vary the thickness thereof, or may be composed of an integral structure. The ring-shaped magnetic member 106 having varying thickness as shown in FIGS. 20A and 20B modifies the output voltage of the Hall element from the solid-lined waveform in FIG. 18 (E) to the broken-lined waveform shown therein, thus providing a higher peak voltage and a less steep slope to facilitate the switching function of the transistors in the aforementioned drive circuits.

In another embodiment shown in FIGS. 21A and 21B, the ring-shaped magnetic member shown in FIG. 19 is bent in the thickness direction, for example in a waved form in cross-section, whereby the magnetic member 108 becomes positioned approximately in the middle in a space between the rotor magnets 100a, 100b and the Hall elements H1 (H2), thus providing a Hall voltage as shown by the broken-lined waveform in FIG. 18 (E).

As explained in the foregoing, the presence of plural fine peaks, as shown in FIG. 17 (A), in the output signal of the sensor elements H1, H2 for detecting the magnetic flux of the rotor magnets gives rise to inappropriate waveforms in the current to the drive circuit, thus causing a reduction in the motor efficiency or output torque or a waste in current as shown in FIG. 17 (D), but such drawbacks in the conventional motor can be resolved according to the present invention in which the sensor element provides only one peak value within a predetermined rotation angle of the rotor.

Although in the foregoing embodiments, the ring-shaped magnetic member 104 or 106 is fixed on the rotor magnets, it is naturally possible also to fix said magnetic member for example on the external tube. Also the Hall elements may be replaced by other suitable position detecting elements such as magnetic resistance elements.

Figures 22A, 22B:
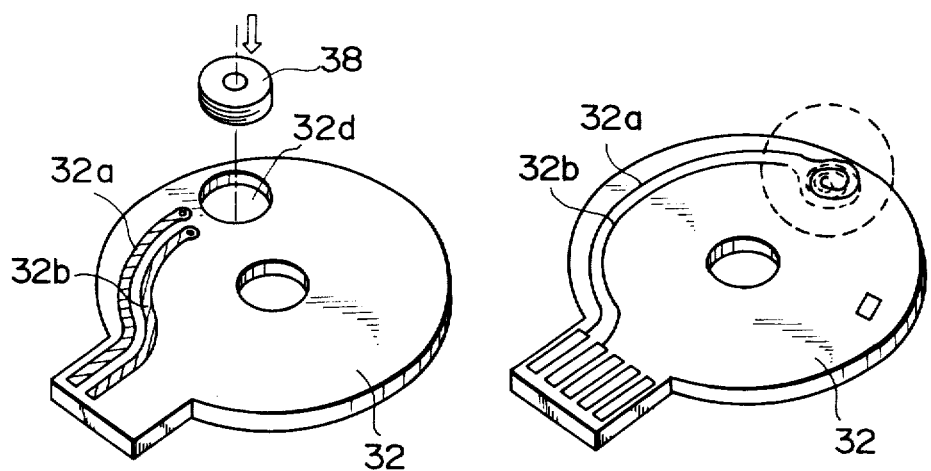
Figure 22C:
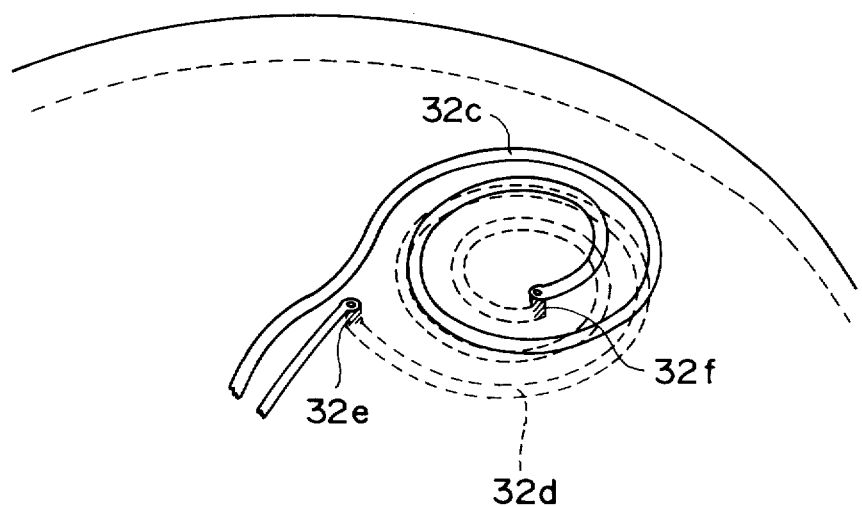

Now reference is made to FIGS. 22A to 22C showing the details of the frequency generator coil 38 provided on the circuit board 32 as shown in FIG. 8.

The frequency generator shown in FIG. 8 is composed, as shown in FIG. 22A, of a coil 38 wound on a bobbin and fitted into an aperture 32a formed in the circuit board 32, and the ends of said coil 38 are soldered to conductive patterns 32a, 32b printed on the board 32.

In another embodiment of the frequency generator shown in FIGS. 22B and 22C, spiral conductive patterns 32c, 32d are formed on both faces of the board 32 at a position corresponding to that of the generator coil 38 in the embodiment shown in FIG. 22A. The conductive pattern 32d formed on the rear face of the board is shown by broken lines. Through holes 32e, 32f are formed for making connections between an end of the spiral pattern on top face and an end of the spiral pattern on rear face, and between the other end of said spiral pattern on rear face and a lead wire pattern 32b connected to the connector.

In the embodiment shown in FIG. 22B, the spiral conductive patterns are formed with photoetching method and constitute a single detecting coil. The coil formed in such manner can have a sufficiently high number of turns and can therefore be made very small. Such coil structure is effective for compactization of the entire motor.

What is claimed is:

1. A motor drive circuit comprising:
   (A) first pulse-forming means for forming pulses in response to the output signals from detecting elements for detecting the position of a magnetic pole of a permanent magnet constituting a rotor, wherein said first pulse-forming means comprises:
      (a$_1$) means for detecting the position of the magnetic pole of said permanent magnet, said detecting means being fixed on a stator with a phase difference of an electrical angle of about 45° relative to exciting coils constituting said stator and generating an electric signal according to the distribution of the magnetic flux of said permanent magnet; and
      (a$_2$) means for converting the signal from said detecting means into a pulse signal;
   (B) second pulse-forming means for detecting the voltages induced in the exciting coils constituting the stator and forming pulse signals in accordance with said induced voltages, wherein said second pulse-forming means comprises:
      (b$_1$) means for detecting the voltages induced in said exciting coils; and
      (b$_2$) means for converting the signals from said induced voltage detecting means into pulse signals;
   (C) means for synthesizing the signals from said first and second pulse-forming means;
   (D) frequency-voltage converting means for converting the frequency of a pulse signal from said synthesizing means into voltage signal;
   (E) reference signal generating means for generating a reference signal determining the revolution of the rotor of the motor; and
   (F) comparator means for comparing the signal from said converting means with the signal from said reference signal generating means and for generating a comparison signal, said comparator means generating a differential signal corresponding to the difference between the signal from said reference signal generating means and the signal from said converting means to control with the differential signal the current supply to the exciting coils.

2. A motor comprising:
   (a) a rotor having a fixed shaft, a cylindrical rotor yoke fixed to said shaft and a permanent magnet fixed on the internal periphery of said rotor yoke;

(b) a stator having a member for supporting an exciting coil, a member for rotatably supporting said shaft and a member for sealing an aperture;
(c) means for detecting the position of a magnetic pole of said permanent magnet, wherein said detecting means includes two detecting elements respectively fixed on said stator in a positional relation of about 45° electrical angle to said exciting coil; and (d) a magnetic member positioned between said permanent magnet and said detecting elements and fixed on an end face of said permanent magnet.

3. A motor according to claim 2, wherein said magnetic member is of an annular form having varying thickness between at the position corresponding to the magnetic pole of said rotor magnet and at the position not corresponding to said magnetic pole.

* * * * *